United States Patent [19]

Atchison et al.

[11] 4,120,698

[45] Oct. 17, 1978

[54] RECOVERY OF NICKEL FROM WASTES

[75] Inventors: Walter D. Atchison, Hudson; Alan English, Cleveland, both of Ohio; Donald Halter, Riddle, Oreg.

[73] Assignee: The Hanna Mining Company, Cleveland, Ohio

[21] Appl. No.: 853,089

[22] Filed: Nov. 21, 1977

[51] Int. Cl.² .............................................. C22D 7/00
[52] U.S. Cl. .......................................... 75/82; 75/21; 75/44 S; 75/129; 75/133
[58] Field of Search ....................... 75/82, 83, 129, 21, 75/44 S, 133

[56] References Cited

U.S. PATENT DOCUMENTS 4,029,495  6/1977  Hirayama .................................. 75/82

Primary Examiner—M. J. Andrews
Attorney, Agent, or Firm—Maky, Renner, Otto & Boisselle

[57] ABSTRACT

A method for recovering nickel from waste materials containing nickel is described which comprises the steps of (a) subjecting a mixture of the waste material and a nickel-containing ore to oxidizing conditions at an elevated temperature,
(b) melting the oxidized mixture,
(c) subjecting the melt to reducing conditions, and
(d) recovering the desired nickel.

More particularly, an inexpensive method is described for increasing the nickel content and/or production of ferronickel obtained from nickel-containing ores using waste nickel materials such as spent nickel catalysts. The invention also provides a novel method for recovering nickel from spent catalyst systems which otherwise often have to be discarded because of contaminants and for using the heat values of the contaminants in the process.

16 Claims, 2 Drawing Figures

RECOVERY OF NICKEL FROM WASTES

BACKGROUND OF THE INVENTION

This invention relates to a novel method for recovering nickel from waste materials containing nickel, and more particularly, to an inexpensive and novel method for improving the nickel content and/or production of ferronickel when used in conjunction with nickel-containing ores.

As is well known to those skilled in the art, nickel-containing catalysts are used in many reactions such as hydrogenation reactions, alkylation reactions, hydroalkylation reactions, cracking processes, etc. Initially, these catalysts perform at a high level, but as the reaction proceeds, the catalyst becomes less active. Eventually, the activity of the catalyst decreases to a point where it is not sufficiently effective to be used in a commercial process.

A wide variety of nickel catalysts and modifications thereof have been described in the art in which they are utilized. Nickel catalysts are used extensively in hydrogenation reactions such as in the hydrogenation of unsaturated organic compounds. Usually, catalysts which are used in hydroalkylation reactions will contain in addition to nickel, other metals such as tungsten. Nickel catalysts used in cracking operations often contain molybdenum and other elements.

Considerable research has been conducted on methods for regenerating spent catalysts and/or recovering nickel from spent catalysts and other nickel-containing waste materials since nickel is an expensive metal to be discarded and, moreover, the safe disposal of waste nickel requires consideration of environmental hazards. Several procedures have been described in the prior art for regenerating spent catalysts. U.S. Pat. Nos. 1,306,871 and 3,926,842 are examples of such disclosures.

One of the difficulties involved in regenerating spent nickel catalysts results from the presence of reaction contaminants such as the various organic materials being treated by the catalyst systems. One method for removing the organic products which contaminate the spent catalysts is by burning off these organic materials at the same time that any nickel in elemental form is oxidized to form nickel oxide. U.S. Pat. No. 1,306,871 describes such a process for oxidizing spent nickel catalysts to remove organic material and form nickel oxide. The patent also describes the transformation of the nickel oxide to nickel by hydrogenation in a current of hydrogen at a temperature of about 300° C.

The regeneration of a nickel catalyst from spent catalyst is tedious, time consuming, and requires careful attention to the details of the procedure. Therefore, there continues to be a need for methods of recovering nickel from spent catalysts which provide for the inexpensive recovery of the nickel in a usable form.

Nickeliferrous ores, in particular laterite ores containing nickel, have been treated pyrometallurgically to recover ferronickel. One example of a pyrometallurgical process for recovering ferronickel from nickel laterite ores involves operation steps whereby the ore is dried, ground to a powder, oxidized, smelted, and finally subjected to reducing conditions to form ferronickel which is separated from the slag.

The amount of ferronickel and the amount of nickel in the ferronickel obtained by such pyrometallurgical processes will depend upon a variety of factors such as the nickel content of the ore, the type and amount of impurities in the ore, and various process parameters, many of which can be varied in accordance with the techniques known to those skilled in the art. It generally is desirable to produce ferronickel having a high concentration of nickel.

SUMMARY OF THE INVENTION

This invention relates to a simplified process for recovering nickel from waste materials containing nickel, and more particularly, to an inexpensive method for recovering nickel from spent catalysts in a ferronickel producing operation. The method of this invention comprises the steps of
  (a) subjecting a mixture of the waste material and a nickel-containing ore to oxidizing conditions at an elevated temperature,
  (b) melting the oxidized mixture,
  (c) subjecting the melt to reducing conditions, and
  (d) recovering the desired nickel.

The addition of a spent catalyst to a nickel-containing ore in accordance with the process of the invention generally results in the production of a ferronickel product of increased nickel content and a reduction in the amount of heat energy added for the process.

DESCRIPTION OF THE PREFERRED EMBODIMENTS

Figure 1:
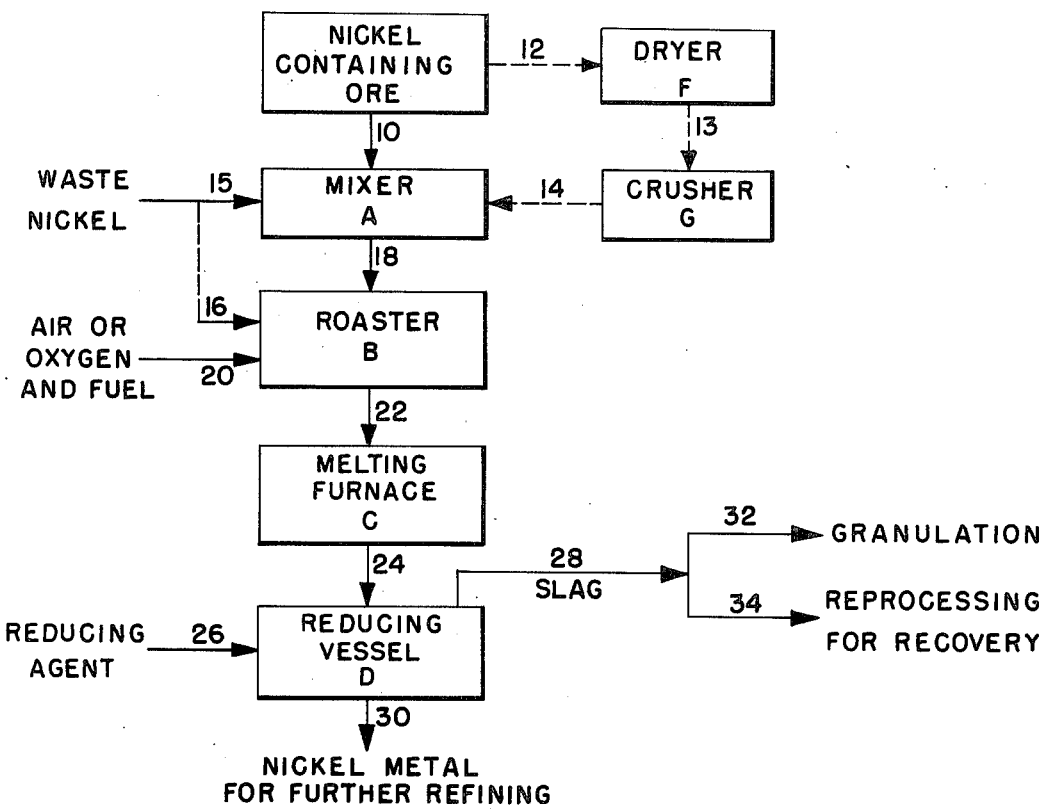

Any waste materials containing nickel in oxidized or oxidizable form can be used in the process of the invention. Preferably the waste material contains material which is easily burned and produces substantial heat values on burning. Spent nickel catalysts particularly are useful in the method of the invention, and these may be any spent nickel catalysts available from any source and particularly from various industrial processes which utilize nickel catalyst systems. The nickel-containing spent catalysts may be obtained from hydrogenation, alkylation, hydroalkylation and cracking processes, and the degree to which the catalysts have been used in the processes is immaterial to their use in the method of the invention. Moreover, the nature of the contaminants, most often organic compounds and products, does not deter from the use of the spent catalysts in the method of the invention. The organic compounds are burned away in the method of the invention. Samples of organic materials which often are present in spent catalyst products are fatty materials such as vegetable or fatty oils, and other edible or inedible oils. Nickel catalysts have been found to be useful and are used extensively in hydrogenation of unsaturated fatty oils. Thus, this commercial application of nickel catalysts provides a ready source of inexpensive spent catalysts for use in the method of the invention.

Spent nickel catalysts containing oily contaminants have been found to be particularly useful since the heat values of the oils are utilized as a heat source in the process of the invention as will be described more fully below. Spent nickel catalysts contaminated with oils can be obtained from oil processors such as Armak Chemical Division, Morris, Illinois; Procter and Gamble, Cincinnati, Ohio; Anderson Clayton Foods, Jacksonville, Illinois, and Cambra Foods, Lethbridge, Canada. Such waste materials contain, for example, from about 4 to 15% nickel and have fuel values of up to about 11,000 BTU/lb, preferably from 6,000 to 11,000 BTU/lb.

The nickel-containing ores which are useful in the method of the invention may be any of the naturally occurring ores which contain sufficient nickel to justify the expense of the recovery of the nickel. One of the most common nickel-containing ores are the nickeliferous ores or the lateritic ores. The lateritic ores which are useful in the method of the invention are oxide complexes containing small amounts of nickel and cobalt while containing iron and substantially larger amounts of magnesia and silica. The nickel content of these lateritic ores varies over a wide range. While in the better deposits, the average nickel content may reach or even exceed 2 to 3% nickel, it is in the range of 1 to 2% nickel in the great majority of the known lateritic nickel ore reserves. An example of a nickeliferous lateritic ore is found in the Riddle Oregon nickel laterite ore deposits. A typical Riddle nickel laterite ore after drying, analyses by weight about 0.7 to 1.8% nickel, 0.01% cobalt, 0.3 to 1.0% chromium, 7 to 13% iron, 24 to 32% magnesia, 45 to 50% silica and about 6 to 7.5% loss on ignition. The amounts of these components will vary somewhat depending on the source of the ore and any preliminary beneficiation treatment. In general, the method of this invention can be conducted on nickeliferrous ores containing from 0.5 up to 2 or even 3% of nickel, although the process can be conducted on ores containing higher amounts of nickel when available.

The nickel-containing ores used in the method of the invention preferably are coarsely ground to the mesh size which is found to be suitable in the method of the invention. Because the natural ores recovered from the ground are wet, the ore generally will be dried prior to grinding to reduce the moisture content. The moisture content of the ore should be reduced to below about 5% and is preferably reduced to about 2-3%. The desired particle size is one which provides for ease of handling and for obtaining maximum nickel recovery. The optimum size for each particular ore is a function of the ore minerology and natural grain size distribution, and may be determined readily by one skilled in the art.

The grinding of the natural ores may be by any mechanical means to form the desired powdered material. Because it is desired to exclude water and moisture as much as possible and to obtain a dry powder, dry grinding techniques are preferred for preparing the powdered ore.

After drying, the powdered ore is size graded such as, for example, by screening, where the large rock particles are rejected, and the remaining particles are classified in at least two categories identified as coarse and fines. Mixtures of coarse and fines are used in the method of the invention. For the Riddle Oregon nickel ores described previously, the coarse ore used in the mixture will have particle sizes in the range of from about −5/16 inches to +20 mesh, and the fines are −20 mesh.

The method of recovering nickel in accordance with the invention is illustrated in the accompanying drawing.

FIG. 1 illustrates the general method of the invention where the nickel-containing ore and the waste nickel are fed to mixer A as indicated by arrows 10 and 15 respectively. As mentioned above, the ores generally are wet and must be reduced to a particle size range suitable for use in the method. Accordingly, the drawing shows advancement of the nickel-containing ore to a dryer F by broken arrow 12 followed by advancement of the dried ore to a crusher G as indicated by broken arrow 13 followed by advancement of the dried and powdered ore to mixer A as indicated by broken arrow 14. The mixer may be any mixer known in the industry for mixing dry powder.

Figure 2:
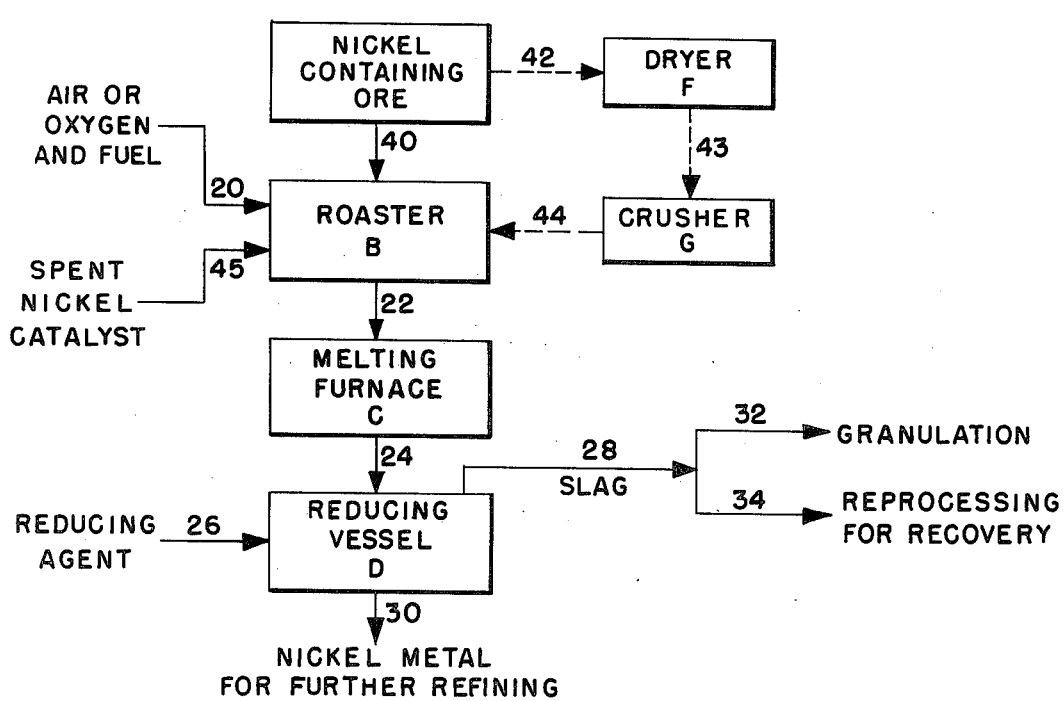

The nickel-containing ore and the spent nickel catalysts are mixed in mixer A, and the mixture is advanced to roaster B which contains an oxidizing atmosphere as indicated by arrow 18. Although not shown in FIGS. 1 or 2, sawdust generally is added to the roaster either with the ore or separately. The amount of sawdust added is readily determined by the operator by monitoring the temperature within the furnace. Multiple hearth roasters (Herreschaft) are useful as oxidizing furnaces. A source of oxygen such as air or pure oxygen and fuel are fed to roaster B as indicated by arrow 20 to maintain the operation of the roaster under oxidizing conditions and at the desired temperature of up to about 925°–955° C. In an alternative procedure, the waste nickel is not mixed with the ore prior to entering roaster B but is fed directly into the roaster as shown by broken arrow 16 at a prescribed rate where it mixes with the ore and is oxidized. This alternative procedure, described and illustrated more fully in FIG. 2, is preferred when the waste nickel material has heat values resulting in a spontaneous increase of the temperature within the oxidizing furnace. Accordingly, fewer heat units must be supplied from an external fuel source thereby reducing costs and minimizing the added energy requirements of recovering nickel in accordance with the method of the invention. Various amounts of the waste nickel material can be mixed with the nickel-containing ore either in the mixer or the roaster. Generally, the waste material is added to the ore in an amount to provide a mixture containing from about 1 to 10% of waste material although additional amounts of waste can be added if desired and if the fuel values of the waste are not excessive.

In FIG. 1, the oxidized mixture then is advanced to a melting furnace C as indicated by arrow 22 where it is heated to a temperature of up to about 1600°–1700° C. Electric furnaces are useful as melting furnaces. The molten ore from the melting furnace is advanced as indicated by arrow 24 to a reducing container D which may be, for example, one or more large ladles. Reduction of the nickel is accomplished in the reducing container by adding a reducing agent as indicated by arrow 26 with vigorous mixing action to provide good contact between the reducing agent and the molten ore. Examples of preferred reducing agents which may be added to the melt include silicon and ferrosilicons. Carbon also can be used as a reducing agent particularly when a submerged ore furnace is used. Ferrosilicons containing from about 45% to 55% silicon particularly are useful. When the vigorous mixing is completed, the nickel is allowed to settle to the bottom of the container and slag is skimmed off the top as indicated by arrow 28. The slag is either granulated as indicated by arrow 32 or reprocessed for recovery as indicated by arrow 34.

As the reducing reactions continue, the nickel accumulates in the ladle and is removed as desired as indicated by arrow 30. Impurities present in the recovered nickel, such as phosphorous, can be removed subsequently by suitable refining slags.

When the nickel-containing ore treated in accordance with the process described above with respect to the drawing is a nickeliferrous ore, such as a Riddle laterite ore, the nickel recovered as a product of the method of the invention is a ferronickel. The introduction of waste nickel into mixer A and/or oxidizing furnace B results in increased production of ferronickel and/or ferronickel having an increased nickel content, the increase being dependent upon the nature and amount of waste nickel used in the method of the invention. In general, the ferronickel produced in accordance with the method of the invention will contain from about 45 to 55% nickel. By incorporating waste nickel into the method of the invention, the nickel content of the ferronickel prepared from a nickeliferrous ore can be increased up to about 4% to 5%, and/or increased production of suitable ferronickel can be obtained from lower grade ores.

FIG. 2 illustrates a modification of the general procedure of FIG. 1 where the waste nickel material used is a spent nickel catalyst such as obtained from hydrogenation of oils, and the nickel catalyst is introduced and mixed with the nickel ore in roaster B as indicated by arrow 45. Arrows and blocks which are identical to those found in FIG. 1 have the same numbers and letters. The nickel containing ore may be dried and ground as indicated by broken arrows 42 and 43 prior to introduction to roaster B as indicated by broken arrow 44. It has been observed that maximum recovery and utility of the heat values of the spent catalyst materials are achieved when the catalyst is introduced at the proper location of the roaster. For example, if the spent catalyst is added near the top (inlet) of a Herreschaft roaster, most of the heat values are lost to the atmosphere before they can be captured. However, if the spent catalyst is added at, for example, the fifth hearth of a 10 hearth roaster, and the feed rate is controlled to avoid excessive combustion, the temperatures within the roaster can be maintained at the desired levels when 10 out of a total of 16 burners within the roaster and even when up to about 60% of the burners are turned off and the amount of sawdust added to roaster B is reduced. The energy savings of the present method is apparent and significant.

After oxidation in roaster B, the mixture is advanced to melting furnace C as indicated by arrow 22, and the melt is advanced to reducing vessel D where reducing agent is added as indicated by arrow 26 and thoroughly mixed with the melt. Slag is withdrawn from the top of vessel D and either granulated (arrow 32) or reprocessed for recovery (arrow 34). Nickel metal is recovered as ferronickel from vessel D and further refined as desired.

The rate of addition of the spent catalyst may vary over a wide range depending in part on the fuel value of the particular catalyst. As mentioned above, fuel values of up to about 11,000 BTU/lb of spent catalyst and higher have been measured on samples obtained from various commercial sources. Since it is important that the temperature at the various hearths of the oxidizing furnace do not get too high, it is necessary to reduce the waste nickel feed rate to the furnace with high BTU catalysts. For example it has been found that a spent catalyst containing about 6% nickel and 44.3% carbon with a fuel value of about 10,000 BTU/lb. could be added to the fifth hearth of the furnace to a maximum rate of about 153 lbs/ton of furnace feed, or 1.2 tons/hour when the furnace ore feed rate was about 16 tons/hour.

For other catalysts having lower fuel values, a higher rate of addition can be utilized. The maximum feed rate is inversely proportional to the catalyst heat content. For example, a spent catalyst having a heat content of 7,000 BTU/lb could be fed at a rate of about 219 lbs/ton of furnace feed without overheating the furnace.

We, therefore, particularly point out and distinctly claim as our invention:

1. A method for recovering nickel from waste materials containing nickel which comprises the steps of
   (a) subjecting a mixture of the waste material and a nickel-containing ore to oxidizing conditions at an elevated temperature,
   (b) melting the oxidized mixture,
   (c) subjecting the melt to reducing conditions, and
   (d) recovering the desired nickel.

2. The method of claim 1 wherein the mixture of waste nickel and ore is melted at a temperature of about 1600°-1700° C.

3. The method of claim 2 wherein a reducing agent containing silicon or carbon is added to the melted mixture of waste nickel and ore.

4. The method of claim 1 wherein the waste nickel is a spent nickel catalyst.

5. The method of claim 4 wherein the spent nickel catalyst is recovered from hydrogenation of fatty organic compounds.

6. A method of improving the nickel content of ferronickel obtained from ores containing nickel and iron which comprises
   (a) oxidizing a mixture of spent nickel catalyst and the ore containing nickel and iron at an elevated temperature,
   (b) heating the mixture at a temperature sufficient to melt the oxidized ore and nickel catalyst
   (c) adding a reducing agent to the melt,
   (d) vigorously mixing the melt and reducing agent whereby ferronickel is formed, and
   (e) recovering the ferronickel.

7. The method of claim 6 wherein the mixture in step a) comprises from about 1 to about 10% of spent catalyst.

8. The method of claim 6 wherein the ore is dried and size graded prior to mixing with the spent catalyst.

9. The method of claim 6 wherein the oxidation of the mixture of ore and catalyst is conducted at a temperature of up to about 925°-955° C.

10. The method of claim 6 wherein the reducing agent added to the melt in step (c) is silicon, a ferrosilicon or carbon.

11. The method of claim 10 wherein the ferrosilicon agent contains from about 45-55% silicon.

12. The method of claim 6 wherein the spent catalyst is a nickel catalyst recovered from hydrogenation, alkylation, hydroalkylation, or cracking reactions.

13. The method of claim 11 wherein the catalyst is a spent nickel catalyst recovered from the hydrogenation of oils and has a fuel value of up to 11,000 BTU/lb.

14. A method of improving the recovery of ferronickel from ores containing nickel and iron utilizing spent nickel catalysts containing fuel values which comprises
   (a) advancing and oxidizing the ore in a multiple hearth oxidizing furnace at an elevated temperature,
   (b) feeding the spent nickel catalyst into the furnace at about the mid point of the advancement of the ore through the multiple hearth furnace whereby the fuel values of the catalyst are used to raise or maintain the temperature within the furnace and any oxidizable nickel in the catalyst is oxidized to nickel oxide, (c) removing the oxidized ore and catalyst mixture from the furnace,
(d) melting the oxidized mixture,
(e) subjecting the melted mixture to reducing conditions to form ferronickel, and
(f) recovering the ferronickel.

15. The method of claim 14 wherein the multiple hearth furnace is a ten hearth Herreschaft furnace and the spent nickel catalyst is fed to the fifth hearth.

16. The method of claim 14 wherein the normal fuel input to the furnace is reduced by up to about 60% and the desired temperature within the furnace is maintained by controlling the feed rate of the spent nickel catalyst to the furnace.

* * * * *